Sept. 10, 1935.  A. C. HOWARD  2,014,282
MERCURY TUBE SCALE INDICATOR CONTROL
Filed March 25, 1932  2 Sheets-Sheet 1
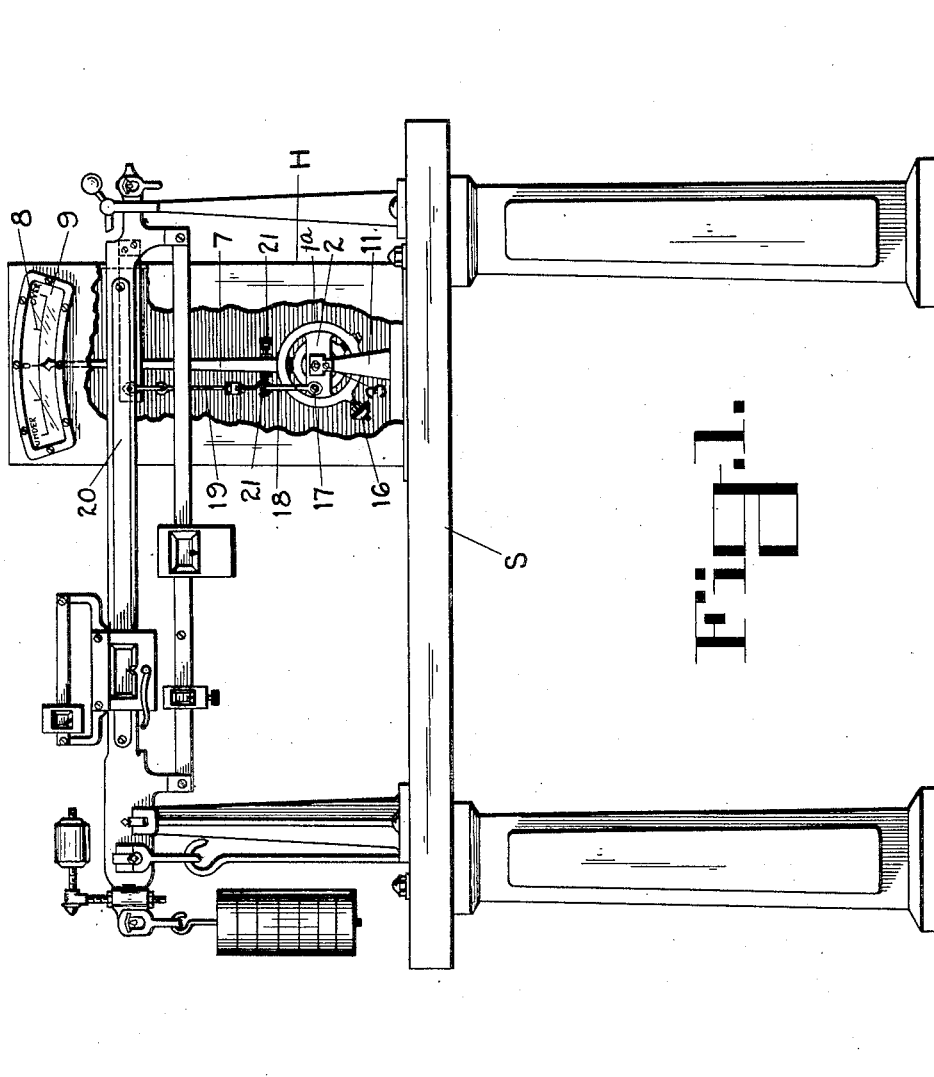
INVENTOR
ALFRED COLQUITT HOWARD
BY
ATTORNEY Sept. 10, 1935.  A. C. HOWARD  2,014,282
MERCURY TUBE SCALE INDICATOR CONTROL
Filed March 25, 1932  2 Sheets-Sheet 2
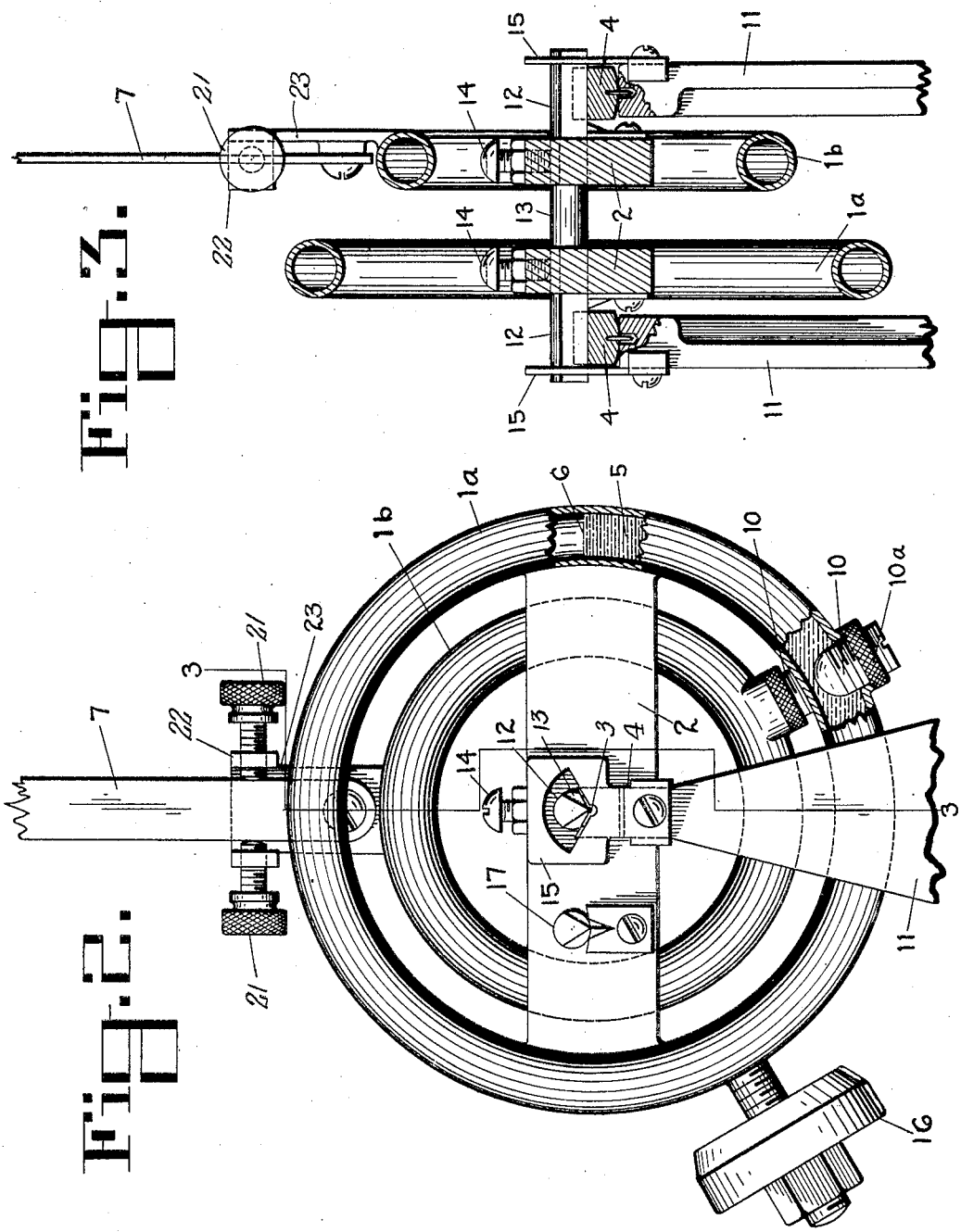
INVENTOR
ALFRED COLQUITT HOWARD
BY
ATTORNEY Patented Sept. 10, 1935

2,014,282

UNITED STATES PATENT OFFICE 2,014,282

MERCURY TUBE SCALE INDICATOR CONTROL

Alfred Colquitt Howard, East Moline, Ill., assignor to E. and T. Fairbanks and Company, St. Johnsbury, Vt., a corporation of Vermont Application March 25, 1932, Serial No. 601,148

6 Claims. (Cl. 265—58)

This invention relates to improvements in mercury tube scale indicator dampening controls, particularly adapted to scale indicators used in co-operation with beam scales and especially to over and under indicators.

In overcoming a tendency to oscillation of scale indicators various means have been employed including different types of dash pots, usually employing oil or air, for dampening or retarding the indicator and aiding in bringing the indicator to a point of rest at the desired graduation on the scale chart.

Therefore, in order to overcome the disadvantages of oil and air dash pots generally used an important object of the invention is to provide efficient means for dampening the indicator with the minimum of friction, whereby the indicator will be brought quickly to rest and a correct indication shown on the chart at that position.

Another object is to provide one or more tubular rings mounted around the pivotal point of support and partially filled with mercury or other suitable liquid and provided with adjustable baffle means creating an impedance that will provide the proper dampening effect for the oscillations of the particular indicator used.

Another object is to provide sensitive bearing means comprising aligned pivot mountings for the mercury tubular rings and a pivot mounting adapted to be flexibly connected to the beam, either above or below.

Another object is to provide two or more co-operating mercury tubular rings of different circumferential amplitudes, by which arrangement means is provided for dampening both the long or initial oscillations and the short or final oscillations of the indicator, whereby the dampening is more effectively accomplished.

Another object is to provide means for equalizing the travel of the indicator on each side of zero, whereby the angular relation between the indicator and the pivot line may be under ready adjustment and control for any variance of overload or underload.

In order that the nature of my invention may be fully understood, I have illustrated certain embodiments of the invention in the accompanying drawings, in which,—

Figure 1 is a longitudinal, front elevation of a weighing scale beam and co-operating parts, showing the invention applied to the beam and mounted below the beam, with the housing broken away to show the parts and their co-operative relation.

Figure 2 is a front elevation of a device, partly in section, showing the use of two co-operating spaced mercury tubular rings and the indicator travel equalizing means.

Figure 3 is a cross section on the line 3—3 of Fig. 2.

Referring to the drawings 1a and 1b each designates an annular tubular member or ring, made of suitable material, mounted on a cross-arm 2, integral therewith, concentrically around a pivotal point of support 3 in the bearing 4. The tubular rings may be used singly, as shown in Fig. 1 or two spaced tubular rings may be employed, which are spaced apart and are of different circumferential amplitudes, as shown in Figs. 2 and 3. Each tubular ring is partially filled preferably with mercury 5 or other suitable heavy liquid having its upper surface 6 in each portion of the tubular ring level with the pivot point 4. Extending upwardly and secured to the ring is an indicator 7, which co-operates with the graduations 8 of the chart 9 in the indicator housing H mounted on the scale shelf S.

Inserted in the under side of the tube wall is an adjustable impedance member or screw plug 10, provided with a lock nut 10a, adapted to extend into the main path of the column of mercury 5 and having a rounded end whereby the the column of mercury is permitted to flow gradually by the impedance member 10 and thus impede or retard the flow of the mercury as the tubular ring is turned to one side or the other, thereby steadying the indicator 7 in its movement and effecting gradual dampening of the indicator. The screw plug 10 being adjustable is adapted to create an impedance that will provide the proper dampening effect for the particular indicator employed by permitting the timing of the flow of the mercury 5 as the tubular ring is rocked, so as to retard or dampen the oscillations of the indicator 7. While the tubular member or ring 1a is preferably circular in form circumferentially it may be made in different diametrical forms for particular purposes, such as a triangular form for use in scales of large capacities, in which form the column of mercury will gravitate and act more quickly than in an annular form.

The support for the tubular ring 1a comprises spaced standards 11 provided with pivot bearings 4 (Fig. 1), in which rest the pivots 12 of the pivot bar 13, to which the cross arm 2 of the tubular ring 1a is fixedly secured by a set screw 14. Pivot end plates 15 serve to retain the pivots 12 and the pivot bar 13 in position. An adjustable counterbalance weight 16, radially offset from the perimeter of the tubular ring 1a, is attached to one side of either the tubular ring 1a or 1b and is adapted to provide means for counter-balancing the weight of co-operating parts on the other side of the tubular ring. A pivot 17 is mounted in the cross arm 2, which is connected to the loop member 18 of a flexible link connection 19 pivotally attached to the beam 20.

In some types of scales, especially scales of large capacities, the indicator control is rendered more accurate and efficient by providing two co-operating and concentrically mounted tubular rings 1a and 1b of different circumferential amplitudes, as shown in Figs. 2 and 3, the larger tube 1a being adapted to dampen or retard the long or initial oscillations of the indicator 7 and the smaller tube 1b serving to dampen the short or final oscillations of the indicator. In such cases involving large capacities the indicator 7 will necessarily have to move in a wide arc so as to cover the wide range resulting from the increased capacity. Therefore, in order to effectively control the movement of the indicator over all ranges and to bring the indicator to a stop at the proper place two tubular rings of different circumferential amplitudes co-operating together are employed. Thus the larger tubular ring 1a is required to effectively dampen the long oscillations of the indicator, since the smaller tubular ring 1b is too slow in its dampening effect on the long oscillations to function well. Therefore, the smaller tubular ring 1b is employed to dampen the short oscillations because the larger tubular ring 1a is ineffective to dampen the short oscillations, since the mercury passes too freely from one side to the other of the plug to produce any appreciable dampening effect on the short oscillations, thus permitting free action of the smaller tubular ring in dampening the short oscillations.

Moreover, since each tubular ring 1a and 1b is approximately half filled with mercury, the larger tubular ring 1a obviously contains more mercury proportionately than the smaller tubular ring 1b, hence the impedance plug 10 of the larger tubular ring 1a is adjusted so as to leave a wide enough opening between the end of the plug and the opposite wall of the tubular ring 1a to permit the mercury to flow more freely from one side of the plug to the other side than in the smaller tubular ring 1b. Therefore, the freely moving column of mercury in the tubular ring 1a allows the indicator 7 to move freely, gradually retarding its long oscillations, until the oscillations come within the short range, when the column of mercury in the tubular ring 1a is too great to have any appreciable dampening effect at this point, since the mercury can pass too freely from one side of the plug to the other side. Therefore, the plug 10 in the smaller tubular ring 1b is adjusted so that the opening between the end of the plug and the opposite wall of the tubular ring 1b is much smaller than in tubular ring 1a and thus the column of mercury is so retarded that the short oscillations are quickly dampened and the indicator brought to a stop. It is evident, therefore, that the combined tubular rings are well adapted for effective dampening of both long and short oscillations, in scales of large capacity, while a single tubular ring is mainly efficient in dampening oscillations in scales of limited or relatively small capacity. In operation, as the indicator 7 goes to the farthest point of travel the long oscillations of the indicator begin and are gradually retarded by means of the larger tubular ring 1a until the oscillations come within the short oscillation range and under dampening control of the smaller tubular ring 1b, and the indicator is quickly brought to a stop.

In order to equalize the travel of the indicator 7 on each side of zero, opposed adjusting screws 21 are mounted in spaced lugs 23 carried by a supporting plate 23 (Fig. 2), integral with the tubular ring carrying the indicator 7 and to which the indicator is pivotally attached, so that the angular relation of the indicator with the pivot line may be readily adjusted and controlled to take care of any overload or underload.

The invention is shown in the drawings applied to an over and under indicator, particularly for use when the load comprises sand, gravel or other aggregates. However, it is to be noted that the device may be readily applied to a dial scale indicator and it will function in the same manner.

While I have shown a preferred embodiment of my invention it is evident that modifications of the invention may be made that will come within the scope of the invention and, therefore, I do not desire to limit the invention to the exact form of construction shown and described herein.

I claim:

1. In a device of the character described, the combination in a unitary structure of vertically disposed dual co-operating tubular rings of different circumferential amplitudes, one of which carries an indicator, concentrically mounted around a common pivotal point of support, and a column of mercury partially filling each tubular ring adapted to control or dampen the long and short oscillations of the said indicator.

2. In a device of the character described, a pair of vertically disposed tubular rings of different circumferential amplitudes, one of which carries an indicator, concentrically mounted around a pivotal point of support and partially filled with mercury forming a mercury column therein, adapted to control or dampen the oscillations of the said indicator, adjustable impedance means extending into the main path of the said mercury column, and means disposed in each of the said mercury columns and integral with the said impedance means for permitting gradual retarding of the flow of mercury within the said tubular rings.

3. In a device of the character described, vertically disposed tubular, conduit means carrying an indicator, pivotally mounted and partially filled with mercury forming a mercury column therein, adapted to control or dampen the oscillations of the said indicator, and an adjustable impedance member having its inner end extending into the main path of the said mercury column comprising a threaded plug inserted in a threaded opening in the lower side of the said tubular ring and provided with a gradually rounded end extending into the mercury column and adapted to gradually retard the flow of mercury by the said rounded end.

4. In a device of the character described, vertically disposed tubular, conduit means carrying an indicator, concentrically mounted around a pivotal point of support by a transverse cross arm integral therewith, the said conduit means being partially filled with mercury forming a mercury column therein and adapted to control or dampen the oscillations of the said indicator, and an adjustable impedance member mounted in the tubular conduit and extending into the main path of the said mercury column and having a rounded tip end adapted to co-operate with the opposite wall of the tubular ring in gradually retarding the flow of the mercury thereby.

5. In a device of the character described, dual cooperating tubular rings of different circumferential amplitudes, one of which carries an indicator, concentrically mounted around a common pivotal point of support and partially filled with mercury forming a column of mercury therein and adapted to control or dampen the long and short oscillations of the said indicator, and adjustable impedance means for retarding the flow of mercury extending into the main path of the column of mercury of each tubular ring.

6. In a device of the character described, duel cooperating tubular rings of different circumferential amplitudes, one of which carries an indicator, concentrically mounted around a common pivotal point of support and partially filled with mercury forming a column of mercury therein and adapted to control or dampen the long and short oscillations of the said indicator, and adjustable impedance means extending into the main path of the column of mercury of each tubular ring and located at an offset position therein.

ALFRED COLQUITT HOWARD.